(12) United States Patent
Liu et al.

(10) Patent No.: US 11,541,817 B2
(45) Date of Patent: Jan. 3, 2023

(54) STORAGE COMPARTMENT CONTAINER

(71) Applicant: Macauto Industrial Co., Ltd., Tainan (TW)

(72) Inventors: Hsin-Kai Liu, Heiligenhaus (DE); Michael Froehlich, Remscheid (DE); Waldemar Siebert, Essen (DE); Sven-Oliver Seel, Wuppertal (DE)

(73) Assignee: Macauto Industrial Co., Ltd., Tainan (TW)

( * ) Notice: Subject to any disclaimer, the term of this patent is extended or adjusted under 35 U.S.C. 154(b) by 0 days.

(21) Appl. No.: 17/322,143

(22) Filed: May 17, 2021

(65) Prior Publication Data
US 2022/0340083 A1    Oct. 27, 2022

(30) Foreign Application Priority Data

Apr. 21, 2021   (DE) ......................... 102021110126.3

(51) Int. Cl.
*B60R 5/04*    (2006.01)

(52) U.S. Cl.
CPC ................... *B60R 5/047* (2013.01)

(58) Field of Classification Search
CPC .................................................. B60R 5/047
USPC ....................................................... 296/37.16
See application file for complete search history.

(56) References Cited

U.S. PATENT DOCUMENTS

| | | | | |
|---|---|---|---|---|
| 5,676,415 | A | * | 10/1997 | Ament ................... B60R 5/047 296/37.16 |
| 7,354,087 | B2 | * | 4/2008 | Ehrenberger .......... B60R 21/06 296/37.16 |
| 8,702,150 | B2 | * | 4/2014 | Saito ...................... B60R 5/047 296/136.03 |

FOREIGN PATENT DOCUMENTS

| | | |
|---|---|---|
| DE | 1973617 C1 | 11/1967 |
| DE | 3922450 C2 | 5/1991 |
| DE | 4441260 C2 | 5/1997 |
| DE | 19621009 A | 10/1997 |
| DE | 19736170 C1 | 4/1999 |
| DE | 10063725 C | 3/2002 |

* cited by examiner

*Primary Examiner* — Joseph D. Pape

(57) ABSTRACT

A storage compartment cover for a vehicle, the storage compartment cover including a housing that supports a winding shaft on an inside of the housing so that the winding shaft is rotatable about a winding shaft axis; a cover web that is supported on the winding shaft and pullable from the winding shaft; two axial housing ends that are respectively covered by respective end caps, wherein at least one movable end cap of the respective end caps is supported moveable between an axially outer engagement position and an axially inner disengagement position; a spring element that supports the at least one movable end cap in the engagement position and imparts a spring reset force upon the at least one movable end cap when the at least one movable end cap is moved into the disengagement position.

12 Claims, 7 Drawing Sheets

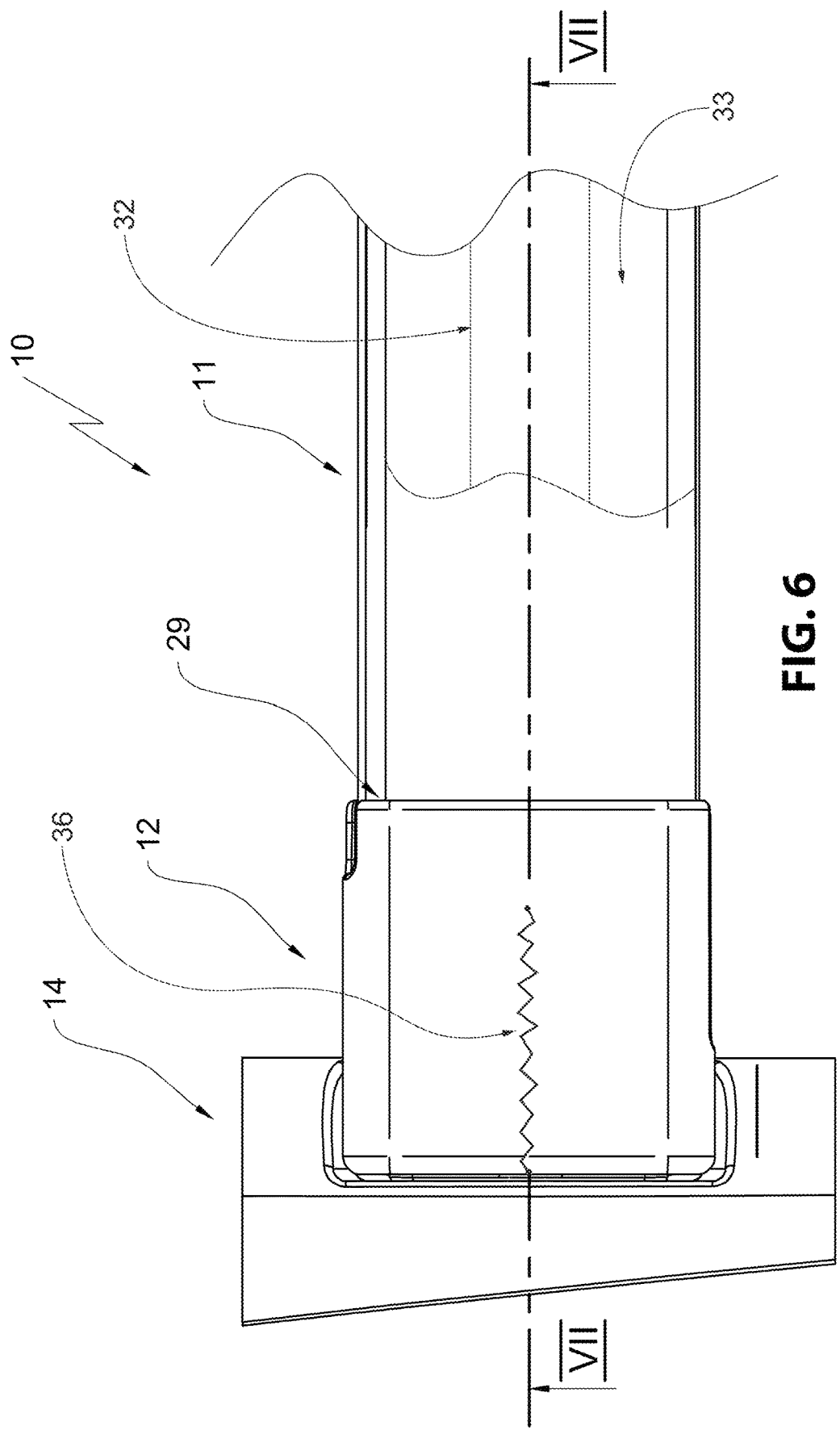

STORAGE COMPARTMENT CONTAINER

RELATED APPLICATIONS

This application claims priority from and incorporates by reference German patent application DE 10 2021 110 126.3 filed on Apr. 21, 2021.

FIELD OF THE INVENTION

The invention relates to a storage compartment cover for vehicles in particular passenger cars.

BACKGROUND OF THE INVENTION

Storage compartment covers are well known in the art and used in particular in station wagons and SUVs and other large vehicles that have a storage compartment that is visible from outside wherein the storage compartment cover protects luggage against viewing by passersby.

DE 392 24 50 C2 shows a storage compartment cover wherein an axially extendable locking pin engages a pocket of the side fairing in order to firmly anchor the storage compartment cover in the vehicle. A lug that is arranged in a base of the receiving pocket for the respective axial end of the storage compartment cover reduces movement clearance that is caused by the fabrication tolerances in the driving direction and prevents a rotation or tilting of the housing in case of an accident or a force that impacts the housing from below.

DE 44 41 260 C2 shows a storage compartment cover where the end caps support stationary locking devices wherein the end caps themselves, however, are arranged at the housing axially movable. In an axially outer engagement position of the respective end cap the locking devices of the end cap engage corresponding attachment devices of the vehicle side receivers. Thus, the storage compartment cover is fixed in the vehicle. In order to disengage the storage compartment cover at least one of the two end caps has to be moved into an axially interior disengagement position against a spring force. Thus, the locking device at the end cap disengages from the attachment device at the receiver. Thus, the fixing of the storage compartment cover in the receivers of the vehicle is disengaged so that the storage compartment cover is dismountable and removable from the receivers. This is useful e.g; when a rear seat row is folded down or removed in order to increase an available storage space volume in station wagons and SUVs.

It is also known from DE 44 41 260 C2 to support the end cap in the disengagement position by a locking bar in order not to have to apply disengagement forces that act against the spring element when lifting the cargo space cover from the vehicle side receivers. The movable end cap remains in the disengagement position until the locking bar engagement is disengaged by the driver manually actuating an operating device so that the end cap is moved back into its interlocked position by the spring forces of the spring element.

Last not least DE 196 21 009 C1 discloses a movably supported end cap that is arrestable by a locking mechanism in an axially outer locked position of the end cap wherein the locking mechanism may operate self-acting. Thus, DE 196 21 009 C1 proposes to combine the self-acting arresting of the end cap in the locking position with a manually disengageable locking of the end cap in the locking position according to DE 44 41 260 C2.

DE 100 63 725 C1 discloses a solution that is comparable to DE 44 41 260 C2. DE 197 36 17 C1 shows a storage compartment cover where a spring load that impacts the end caps for fixing the storage compartment cover in the vehicle is reduceable or removable by a lever mechanism in order to simplify removal and dismounting of the storage compartment cover.

Storage compartment covers with end caps that are fixable in the disengagement position are not available in the market any more today. These have the essential advantage that the housing can be effectively reduced in length and is thus easily storable in the vehicle when the storage compartment cover is not in use. However, it has become evident that the typically longer non-use of the storage compartment cover and the storage can cause operator errors. The operator inserts the storage compartment cover into the receivers but typically forgets to unlock the end caps so that the storage compartment cover is not firmly supported in the vehicle which is a safety hazard.

BRIEF SUMMARY OF THE INVENTION

Thus, it is an object of the invention to provide a storage compartment cover that maintains safety at all times.

The object is achieved by a storage compartment cover for a vehicle, the storage compartment cover including a housing that supports a winding shaft on an inside of the housing so that the winding shaft is rotatable about a winding shaft axis; a cover web that is supported on the winding shaft and pullable from the winding shaft; two axial housing ends that are respectively covered by respective end caps, wherein at least one movable end cap of the respective end caps is supported moveable between an axially outer engagement position and an axially inner disengagement position; a spring element that supports the at least one movable end cap in the engagement position and imparts a spring reset force upon the at least one movable end cap when the at least one movable end cap is moved into the disengagement position; a locking bar that retains the at least one moveable end cap in the disengagement position in a locked position of the locking bar and that facilitates a movement of the at least one movable end cap into the engagement position in an unlocked position of the locking bar; an operating device that facilitates unlocking the locking bar so that the spring reset force moves the at least one movable end cap from the disengagement position into the engagement position; locking devices arranged at the respective end caps; receivers for the storage compartment cover, wherein the receivers are at least indirectly fixed at a body of the vehicle and include attachment devices that cooperate with the locking devices and support the storage compartment cover when the at least one movable end cap is in the engagement position, wherein the operating device unlocks the locking bar self-acting and moves the locking bar into its unlocked position during insertion of the at least one movably supported end cap into one of the receivers so that the at least one movably supported end cap is moved into the engagement position by the spring reset force of the spring element and secures the storage compartment cover in the receiver.

Automatic unlocking of the locking bar that supports the end cap in the disengagement position by the operating device during insertion of the end cap in the associated receiver assures in any case that the end cap is moved into its engagement position by the spring element. Thus, the end cap enters into the connection with the associated receiver wherein the connection fixes the storage compartment cover in the vehicle in that the locking devices of the end cap engage the attachment devices of the associated receiver.

The driver does not have to pay attention anymore to disengage the locking bar manually. The prior art safety risk of carrying a storage compartment cover in the vehicle that is not fixed in the receiver is excluded by the self-acting unlocking. The risk that the storage compartment cover moves through the vehicle out of control caused by an accident or by rapid deceleration of the vehicle or for other reasons is reliably prevented by the invention.

The automatic unlocking of the locking bar by the operating device is advantageously achieved in that the operating device interacts with a vehicle component that is proximal to the cargo space cover during insertion of the movably supported end cap into the receiver.

In an advantageous embodiment the receiver includes at least one contact surface that interacts in a surface pairing with an outer surface of the housing, in particular an outer surface of the movably supported end cap, wherein the operating device is arranged at the housing oriented towards an outer surface, in particular of the movably supported end cap, wherein the operating device disengages the locking bar self-acting when the surface pairing is engaged.

Thus, it is particularly advantageous when the operating device forms part of the end cap and interacts directly with a triggering section of the contact surface of the receiver in order to unlock the locking bar and to facilitate a movement of the end cap from the disengagement position into the engagement position wherein the movement is urged by the spring element.

In an advantageous embodiment the operating device includes a trigger surface that is aligned flush in a locked position of the locking bar with the outer surface of the housing, in particular the outer surface of the movably supported end cap or wherein the trigger surface is recessed relative to the outer surface of the movably supported end cap in a direction of the housing longitudinal axis.

When the trigger surface of the operating device is configured as recited supra an erroneous unlocking of the locking bar when inserting the storage compartment cover is reliably prevented. This assures that the end cap remains in the disengagement position during storage of the non-utilized storage compartment cover and a simple insertion of the storage compartment cover into the vehicle side receiver is assured by the achieved housing shortening when the end caps are in the disengagement position.

Thus, it is particularly advantageous when the trigger surfaces of the operating device are recessed relative to the outer surface of the end cap or the housing in the locked position of the locking bar, thus the trigger surfaces are arranged at an inside. This does not only protect against erroneous operation, but the recess thus created can cooperate with positioning or centering devices at the receiver in order to assure a positionally correct arrangement of the storage compartment cover in the respective receiver.

It is furthermore provided according to the invention that the storage compartment cover includes a trigger contour that cooperates with the operating device.

The trigger contour at the receiver has the advantage that the locking bar is only unlocked when the trigger contour cooperates with the operating device which reliably prevents an erroneous triggering during insertion of the storage compartment cover into the receivers.

When the trigger surface of the operating device is arranged flush with the surface or recessed relative thereto as recited supra the protection against erroneous triggering in the receiver can be implemented in a very simple manner. Last not least a protruding trigger contour that engages the end cap of the storage compartment cover can simultaneously have a positioning or centering effect and can thus function as a centering or positioning device at the receiver.

Thus, it is provided that the trigger contour is configured as a protrusion relative to a contact surface of the receiver for the movably supported end cap.

In order to provide the axial movement of the movably supported end cap from the disengagement position into the engagement position in this constellation it is provided that the outer surface of the housing, in particular the outer surface of the moveably supported end cap includes an axially oriented relief cut which facilitates an axial movement of the end cap when the trigger contour engages.

The invention is implementable in a particularly simple manner when the operating device supports the locking bar, wherein the locking bar forms in particular a component that is integrally provided in one piece with the operating device. This way a reduction of the components of the locking mechanism of the storage compartment cover is achieved.

In an advantageous, embodiment the operating device is a hook that is pivotably arranged in the housing between an unlocked position and a locked position wherein the hook includes a trigger arm that is arranged in front of a locking bar axis and a locking arm that is arranged behind the locking bar axis, wherein the locking arm includes the hook element, and the trigger arm includes the trigger surface.

When using a hook of this type as a locking bar the locking bar can be retained in its locked position in a particularly simple manner when the trigger arm or the locking arm is spring loaded when it supports the hook element in the locked position. This embodiment also has the essential advantage that the hook element can penetrate the engagement opening when reaching the corresponding engagement opening and can move into its locked position without separate control.

In a particularly simple and effective manner the self-acting unlocking of the locking bar of the movably supported end cap can be assured when the operating device is arranged at a down facing bottom side of the housing, in particular of the first end cap. Thus, the weight of the storage compartment cover suffices in order to induce the unlocking effect of the operating device upon the locking bar.

Last not least an advantageous embodiment of the locking bar has the locking bar and the operating device arranged at the movably supported end cap and includes a locking bar engagement feature in an end portion of the housing that is covered by the end cap wherein the locking bar engages the engagement feature and retains the end cap in the disengagement position.

BRIEF DESCRIPTION OF THE DRAWINGS

The invention is now described based on an advantageous embodiment with reference to drawing figures, wherein:

FIG. 6 illustrates a left end of the storage compartment cover of FIG. 1 in a top view in an engagement position of the end cap;

DETAILED DESCRIPTION OF THE INVENTION

Figure 1:
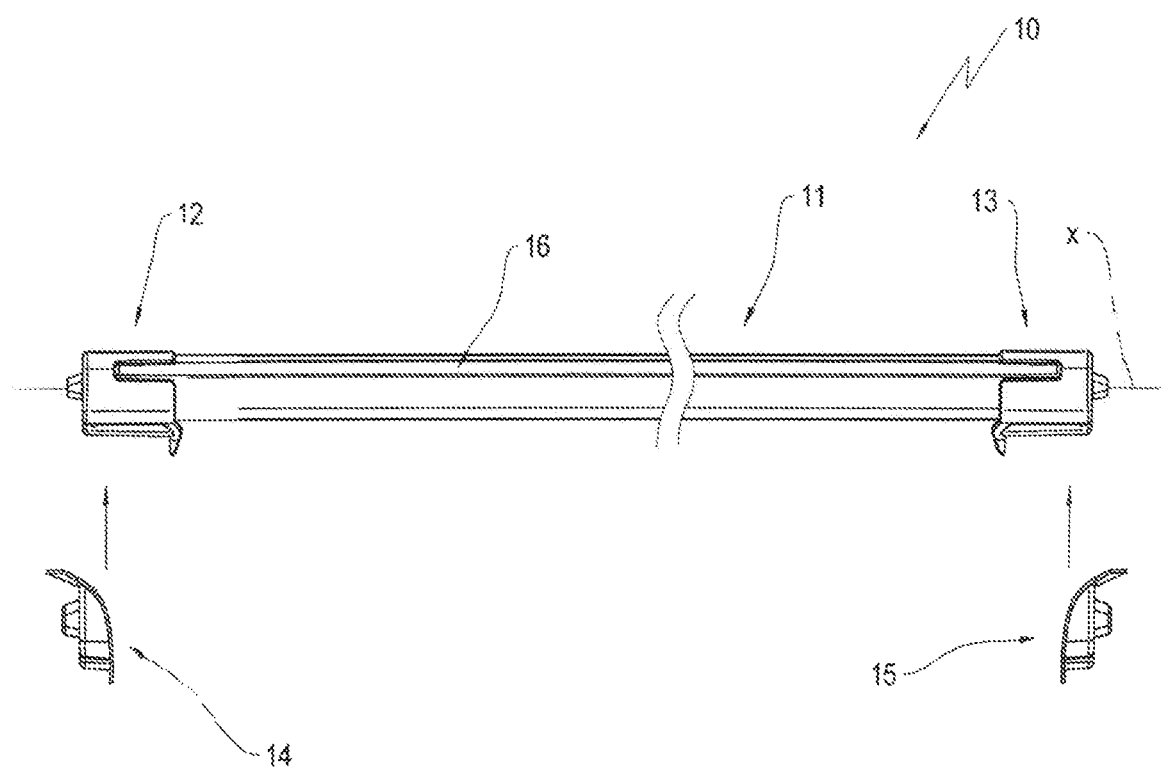
FIG. 1 illustrates a storage compartment cover according to the invention.

The drawing figures show a storage compartment cover according to the invention is labeled overall with reference numeral 10.

The storage compartment cover 10 includes a housing 11 with a left or first end cap 12 and a right or second end cap 13. A left or first receiver 14 is associated with the left end cap 12. A right or second receiver 15 is associated with the right end cap 13.

The storage compartment cover 10 includes a pull-out slot 16 in the housing 11 that extends into the end caps 12, 13 in the illustrated embodiment. A cover web 33 is pullable from the housing 11 through the pull-out slot and stored on a winding shaft 32 which is rotatably supported in the housing 11. The winding shaft 32 supports a reset unit which is typically a spring packet. The reset unit imparts a force upon the winding shaft 32 that acts in a wind-up direction of the cover web 33 when the cover web 33 is pulled from the winding shaft 32 against the reset force.

The two end caps 12, 13 are movably supported at the housing 11 along a housing longitudinal axis X and are movable back and forth between an outer and an inner end position.

The end caps 12, 13 are in an engagement position in a respective outer axial end position wherein a respective axial inner end position defines a disengagement position of the end caps 12, 13. Both end caps 12, 13 are urged into their outer axial end position thus into their engagement position by a spring element 36.

Figure 3:
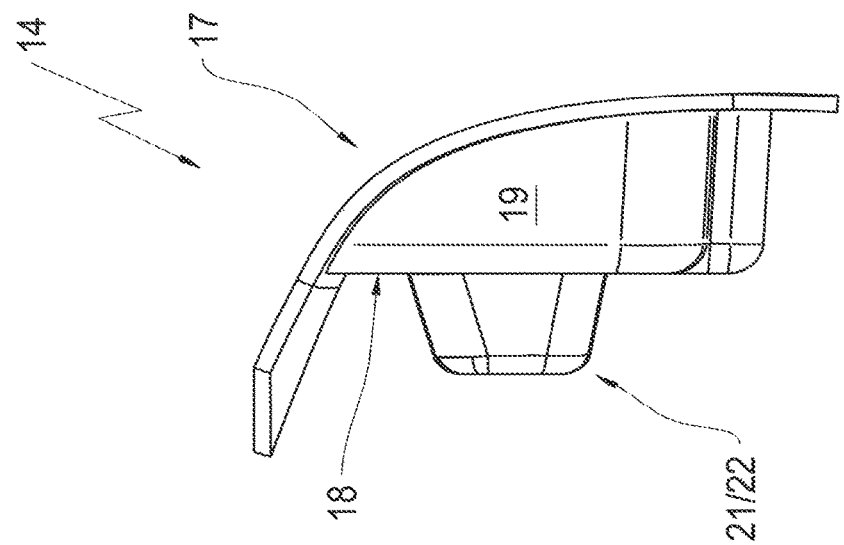
FIG. 3 illustrates the receiver according to FIG. 2 in a side view.
Figure 2:
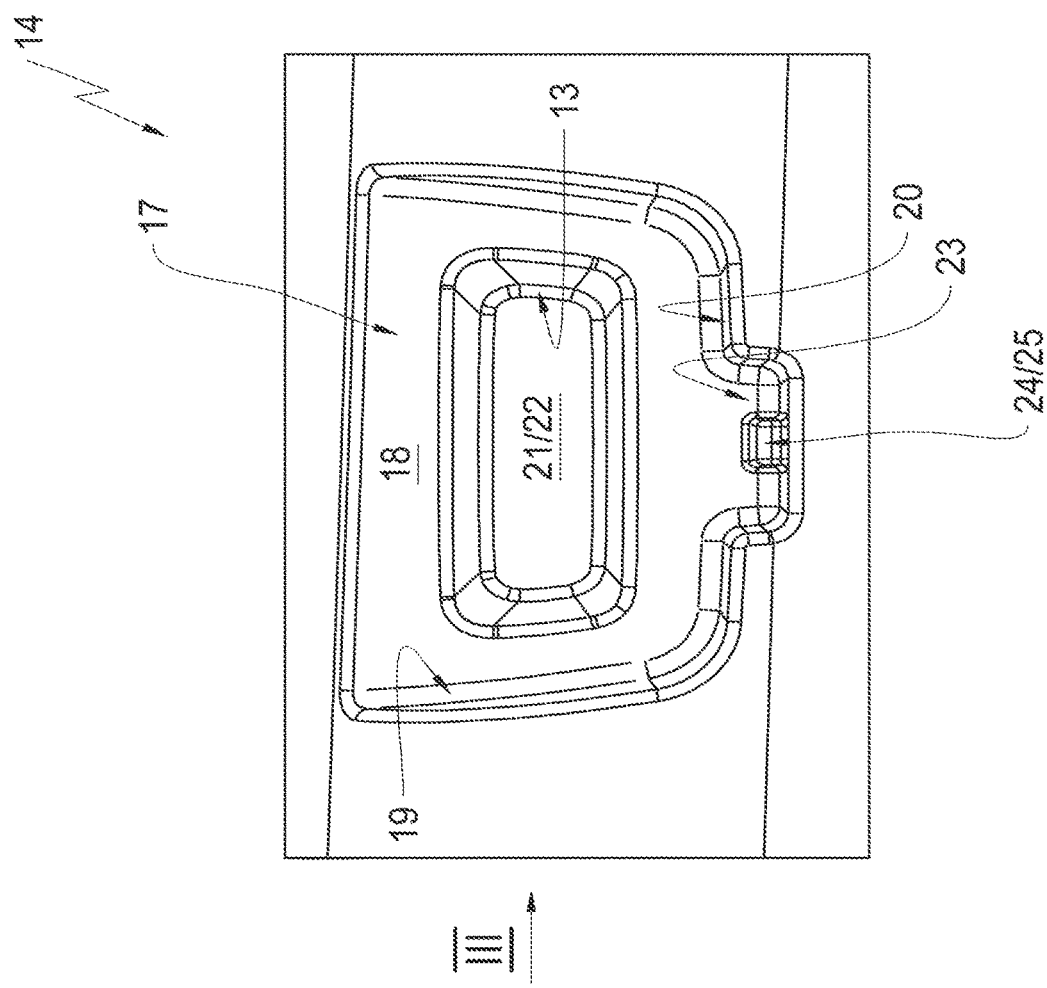
FIG. 2 illustrates a view into a receiver of the storage compartment cover according to FIG. 1.

FIGS. 2 and 3 show the left or first receiver 14 in different views. FIG. 2 shows the receiver 14 looking at the attachment devices of the receiver, thus looking along the housing longitudinal axis X, whereas FIG. 3 illustrates a side view according to arrow III in FIG. 2 of the left receiver 14.

The subsequent description also applies to the right receiver 15 that is configured identical and merely arranged mirror symmetrical on an opposite side of the storage compartment cover 10.

The receiver 14 forms a recess 17 that extends axially along the housing longitudinal axis X wherein a base 18 of the recess is oriented orthogonal to the housing longitudinal axis X and defined by two opposite side walls 19 and a contact wall 20 that connects the opposite side walls 19, wherein the support wall 20 is arranged at a bottom side viewed in gravity direction. The recess 17 is open in a direction towards a top side that is arranged opposite to the support wall 20 so that the housing 11 is insertable from there into the recess with its end cap 12.

The base 18 of the recess 17 is provided with a bulge 21 that extends in the axial direction and that tapers in a frustum shape wherein the bulge functions as an attachment device of the receiver 14.

Last not least the lower support wall 20 of the receiver 14 includes a centering recess 23 that extends radially with reference to the housing longitudinal axis X downward and which is configured approximately U-shaped. A trigger contour 24 configured as a trigger rib 25 is configured in the centering recess 23.

For the invention it is irrelevant whether the trigger contour is configured within the centering recess or in another portion of the receiver 14. In an advantageous embodiment the triggering contour 24 even when configured as a trigger rib can perform an additional function as a centering contour. Thus, the triggering contour 24 can replace the centering recess 23 illustrated in FIG. 2.

Figure 5:
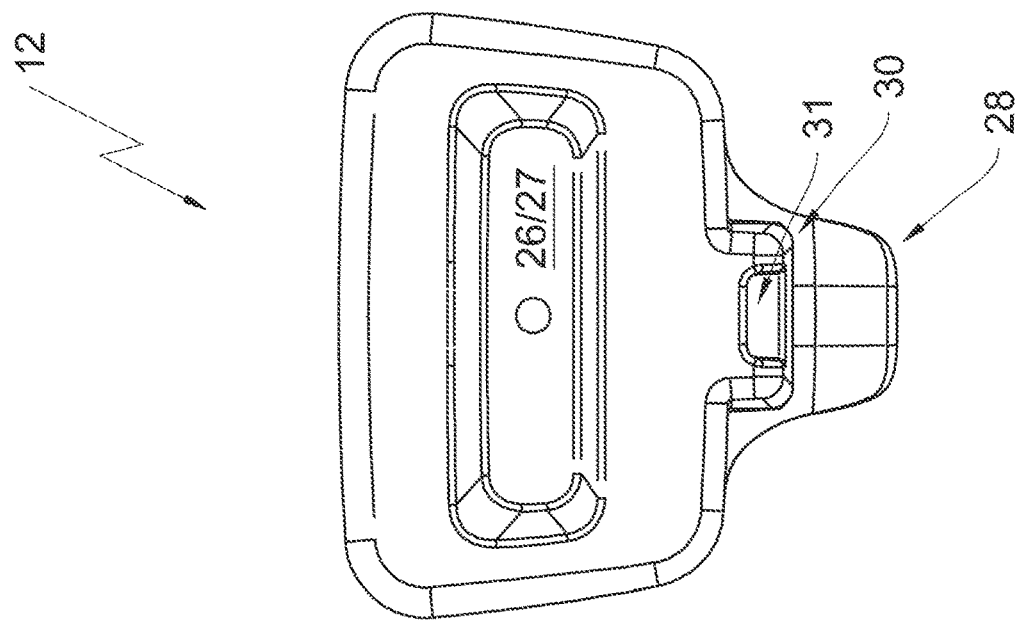
FIG. 5 illustrates the end cap according to FIG. 4 showing the locking devices.
Figure 4:
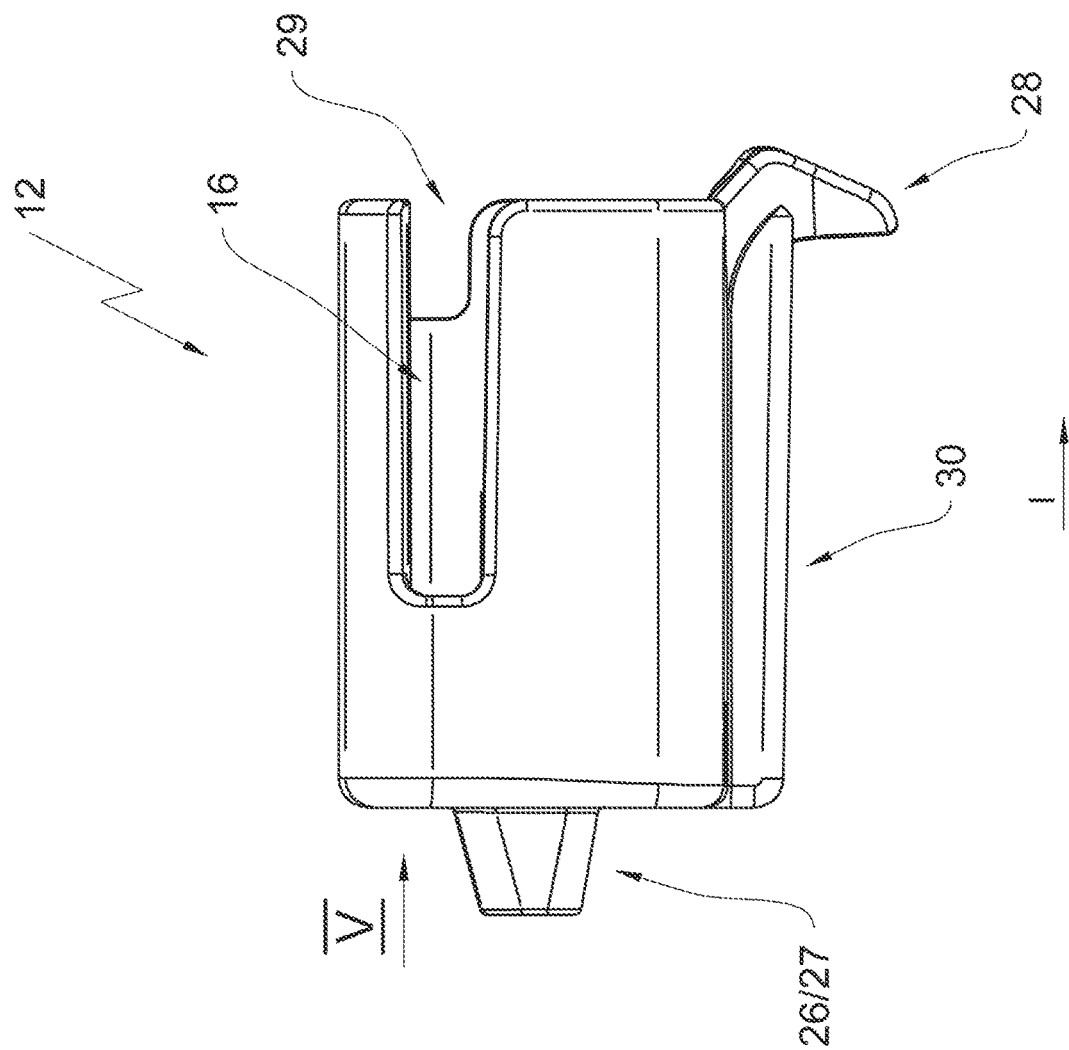
FIG. 4 illustrates an end cap of the storage compartment cover according to FIG. 1 in a side view.

FIGS. 4 and 5 illustrate the left or first end cap 12 wherein FIG. 4 illustrates a side view and FIG. 5 illustrates a face view of the axial end surface the end cap 12 according to the viewing arrow V in FIG. 4.

The subsequent description applies analogously to the right end cap 13 that is essentially configured identical but arranged mirror symmetrical in the housing 11.

The end cap 12 supports a portion of the pull-out slot 16 and forms a locking device 26 configured as an axially outward protruding locking boss 27 at this axially oriented face wall.

A gripping protrusion 28 is formed at a downward oriented bottom side of the end cap 12 wherein the end cap 12 is movable against a spring force of a spring element 36 in an axially inward direction, this means towards an opposite end, thus in a direction of the right end cap 13 or in arrow direction I in FIG. 4. The spring element 36 urges the end cap that is movable on the winding shaft 32 in axially opposite direction A into the outer axial end position. This gripping protrusion is formed at an inner axial end of the end cap 12 wherein the axial inner end is otherwise characterized by a receiving opening 29 configured to receive the housing 11.

The bottom side of the end cap 12 viewed in gravity direction includes a centering bar 30 that extends radially with respect to the housing longitudinal axis X wherein the centering bar is configured to be inserted into the centering recess 23 of the receiver 14 and has an axial longitudinal orientation.

The centering bar 30 in turn includes a receiving groove 31 that is recessed from a bottom side of the centering bar in a radially inward direction, thus towards the housing longitudinal axis X, wherein the trigger rib 25 is inserted into the receiver 14 when the end cap 12 is inserted into the receiver 14.

FIG. 6 shows the left end of the storage compartment cover 10 in a top view. This view illustrates how the left end of the housing 11 is inserted into the receiving opening 29 of the left end cap 12 and how the left end cap 12 is inserted into the left receiver 14 from above.

Figure 7:
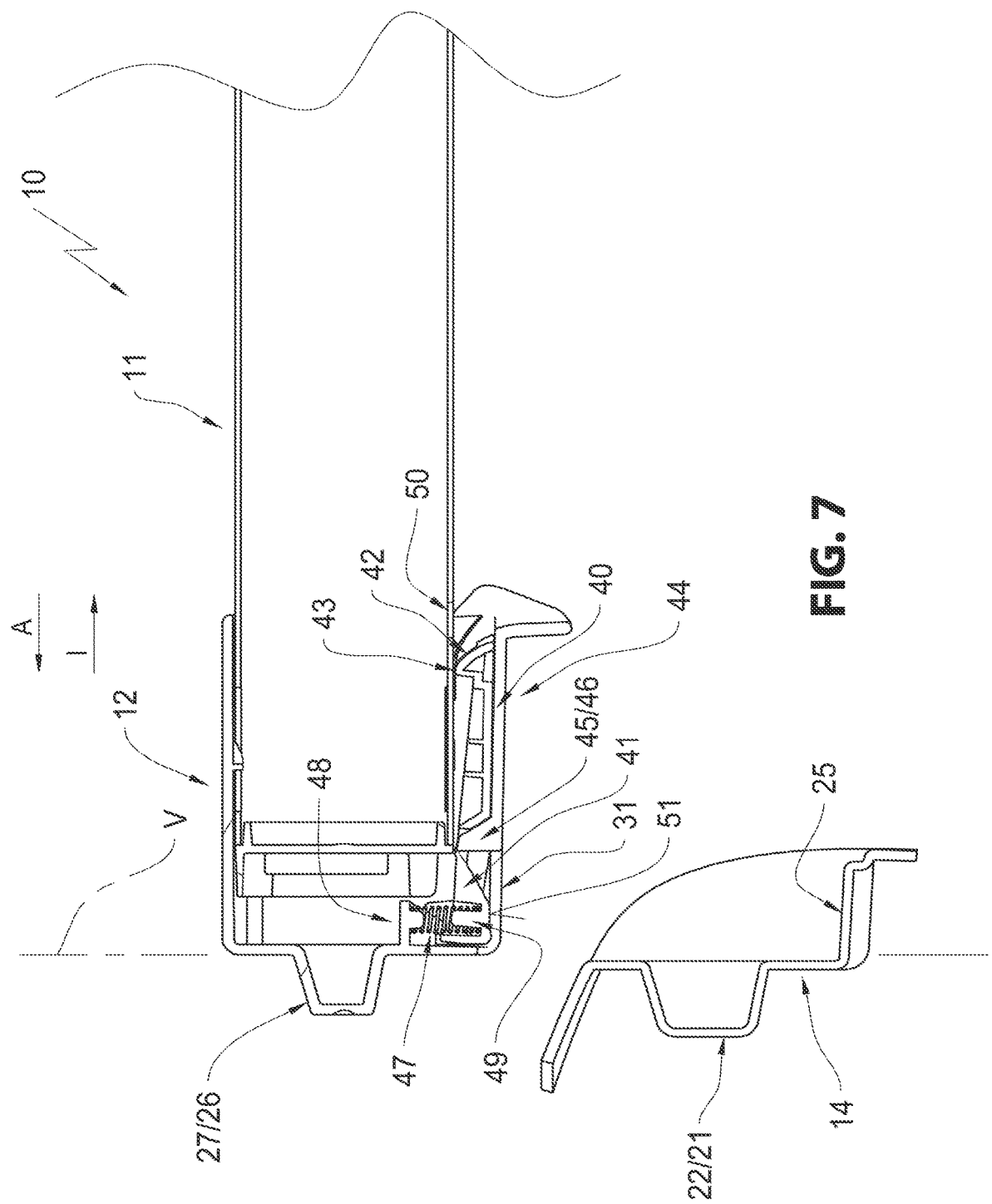
FIG. 7 illustrates the left end of the storage compartment cover according to a sectional line VII-VII in FIG. 6 in the engagement position of the end cap with the locking bar in the unlocked position.
Figure 8:
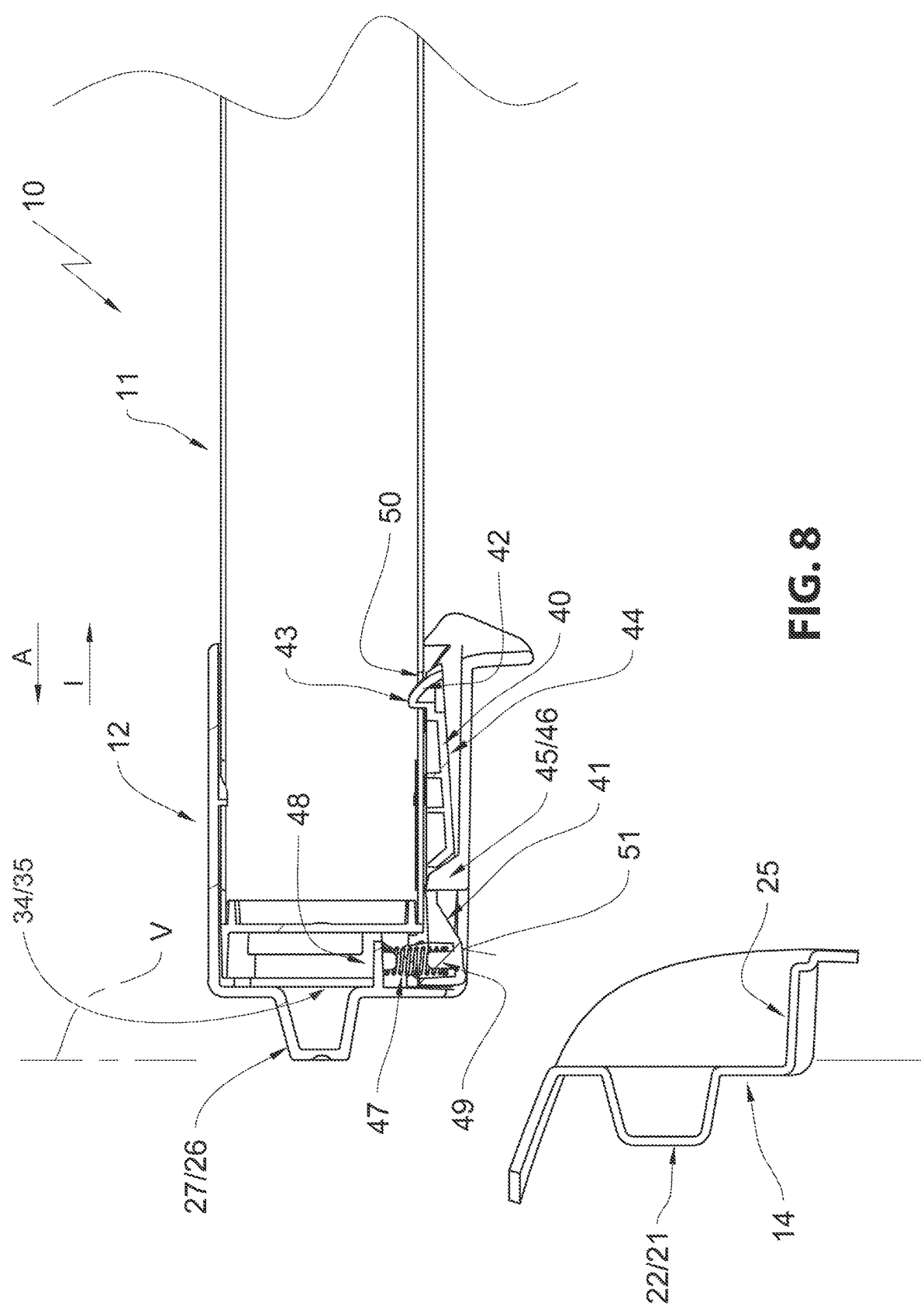
FIG. 8 illustrates a representation according to FIG. 7 in a disengagement position of the end cap with the locking bar in the locked position.
Figure 9:
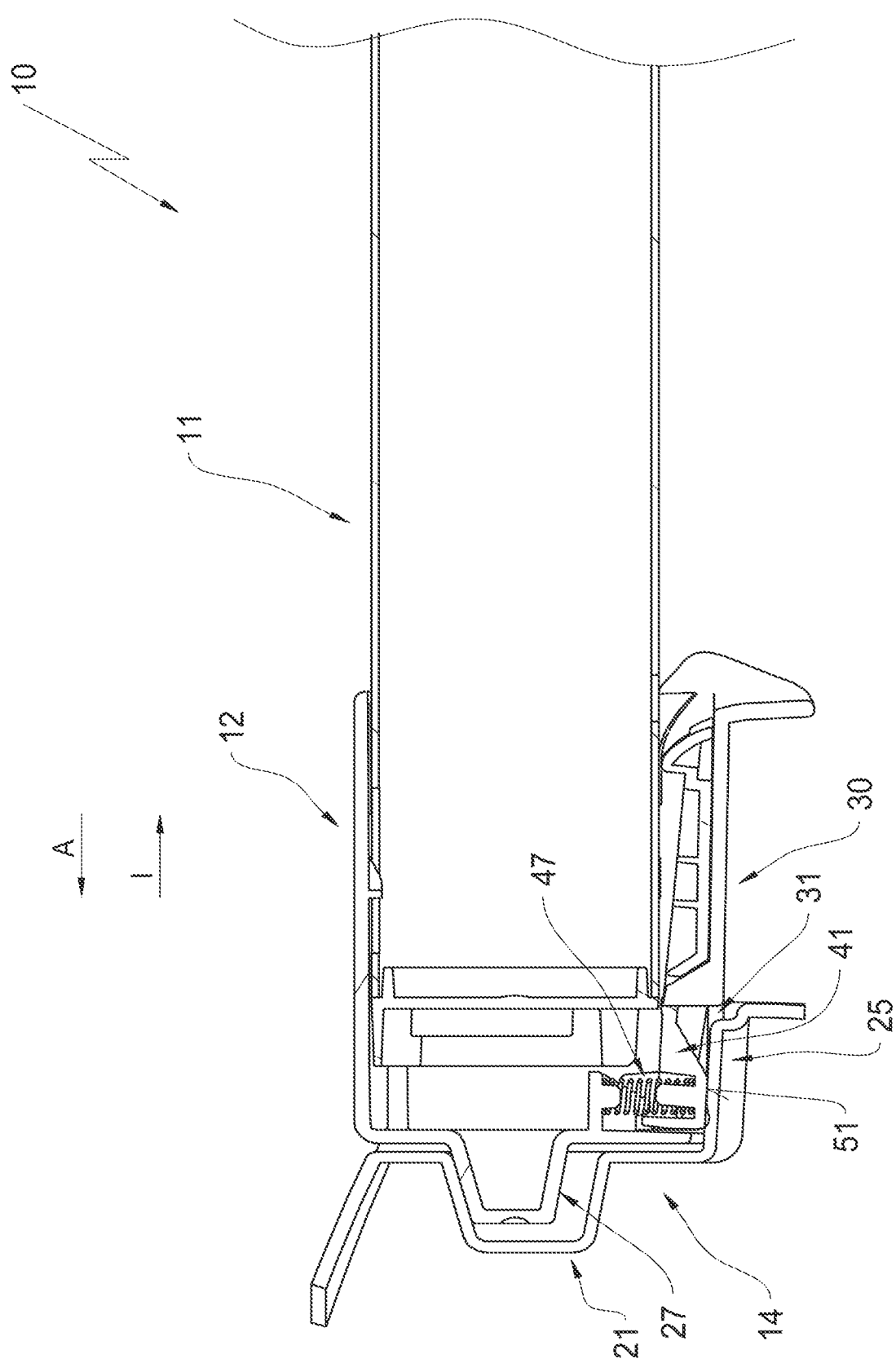
FIG. 9 illustrates the representation according to FIG. 7 with a housing end that is inserted into the receiver in the engagement position of the end cap.

FIG. 7-9 respectively show a sectional view according to the sectional line VII-VII in FIG. 6. Thus, the left end of the housing 11 is lifted from the receiver 14 in FIGS. 7 and 8 and the end cap 12 is in its outer axial end position, thus the engagement position in FIG. 7. In FIG. 8 the end cap 12 is in its inner axial position, the disengagement position. FIG. 9 corresponds to FIG. 7, however, has the end cap 12 inserted into the receiver 14. Essential features of the invention will now be described with reference to FIGS. 7-9.

FIG. 7 illustrates the storage compartment cover 10 or more precisely its left end in the sectional view. The housing 11 is inserted into the end cap 12. The end cap 12 is supported on the housing 11 so that the end cap 12 is longitudinally movable in the direction I and A. The end cap 12 supports a locking element 44 in an interior at its bottom side. The locking element includes a locking bar also designated as locking arm that is overall designated with the reference numeral 40 and inserted into the end cap 12 so that it is pivotable in the radial direction. The locking bar 40 includes an operating device 41 with a trigger arm, wherein the operating device 41 and the locking bar 40 are integrally provided in one piece. The locking bar 40 is provided with a hook 42 that includes a hook nose 43 that is oriented towards the housing 11, thus in an inward direction along the housing longitudinal axis X. The end cap 12 forms a pivot bearing 45 for a pivotable arrangement of the locking element 44. The pivot bearing 45 includes a support protrusion 46 that oriented in a direction of the housing longitudinal axis X on which the locking element 44 is supported and where the geometric pivot axis is arranged. The locking element 44 includes the operating device 41 with the trigger arm that is arranged in front of the locking axis or the support protrusion 46 and the locking bar 40 also designated as locking arm that is arranged behind the pivot axis and includes the hook 42. When the hook 42 pivots in a direction towards the housing 11, this causes an opposite pivoting of the operating device 41 so that the operating device 41 is moved in a radially outward direction towards the bottom side. An opposite movement of the operating device 41 towards the housing longitudinal axis X causes a pivoting of the bar 40 away from the housing longitudinal axis X in a downward direction.

The locking element 44 assumes two possible positions. When the hook 42 is in a pivot position that is proximal to the housing longitudinal axis X or on a radial inside the locking bar 40 or locking element 44 moves into its locking position. When the hook 42 or the locking bar 40 is in a pivot position that is distal from the housing longitudinal axis X or on a radial outside the locking bar 40 or the locking element 44 are in the unlocked position.

FIG. 7 illustrates a spring element 47 configured as a coil spring. The coil spring is supported at a bearing pin 48 of the end cap 12 on one side and at a bearing shell 49 of the operating device 41 on another side and urges the operating device 41 into its outer radial pivot position and thus preloads the locking bar 40 towards its locked position.

The housing 11 includes a hook recess 50 at a bottom side. When the locking bar 40, in particular its hook 42 is aligned with the hook recess 50, thus the end cap 12 is moved into its inner end position, the hook nose 43 can engage the hook recess 50 and support the end cap 12 in the inner end position against a spring force that acts in an axially outward direction A.

In FIG. 7 that illustrates the end cap 12 in its outer end position the hook nose 43 is supported in a portion of the housing wall that is arranged in front of the hook recess 50.

It is evident from FIGS. 7-9 that the locking element 44 is supported in the centering bar 30 of the end cap 12 and the operating device 41 is accessible through the receiving groove 31 of the centering bar 30. The operating device 41 includes a trigger surface 51 that is oriented in downward direction, thus in a direction towards the trigger rib 25 of the receiver 14.

FIG. 7 shows the cooperation of the locking device 26 configured as the locking skid 27 of the end cap 12 with the attachment device 22 configured as a bulge 21 of the receiver 14. The bulge 21 and the locking skid 27 have similar contours so that an engagement of the axially protruding locking skid into the axially recessed bulge 21 causes a firm interlocking of the end cap 12 and thus of the housing 11 in the receiver 14.

FIG. 8 shows a representation similar to FIG. 7 besides the left end cap 12 being moved in a direction I into its inner axial end position, thus its disengagement position. This is evident in particular by comparing the relative position of the housing 11 in FIG. 1 and FIG. 8 with reference to the comparison line V.

FIGS. 7-8 differ with respect to a position of the locking element 44. In FIG. 7 the locking element 44, in particular its locking bar 40 was in its unlocked position, this means the hook 42 is in a radially outer pivot position, the operating device 41 is in its inner pivot position.

FIG. 8 shows the locking element 44, in particular its locking bar 40 in its locked position. The hook 42 is arranged in its radially inner pivot position and engages the hook recess 50 with the hook nose 43. The operating device 41 however is in its radially outer pivot position. The hook 42 that engages the hook recess 50 supports the end cap 12 in its inner axial position, thus in the disengagement position. In the disengagement position, the locking skids 27 of the end cap 12 does not engage the bulge 21 of the recess 40 so that an anchoring of the housing 11 in the receiver 14 is not provided. The housing 11 is retrievable from the receiver 14 easily.

Comparing FIGS. 7 and 8 it is evident that the operating device 41 of the locking element 44 does not protrude relative to an outer surface, in particular the bottom side of the end cap 12 in any possible pivot position. Rather, the trigger surface 51 terminates approximately flush with the outer surface in the engagement position of the locking bar 40, in particular flush with the bottom side of the end cap 12 or is slightly recessed due to its shape relative to the outer surface in a direction towards the housing longitudinal axis X. A significant offset of the trigger surface 51 along the housing longitudinal axis X, thus a pull back into the end cap 12 is provided when the locking bar 40 with its hook 42 is in its locking position, thus the end cap 12 is arranged in its outer axial end position and assumes its engagement position where the end cap 12 is anchored in the receiver 14.

The non-protruding arrangement of the trigger surface relative to the outer surface in any possible pivot position of the operating device 41 has the essential advantage that unintentional actuation of the locking bar 40 of the end cap is reliably preventing in the axially inner end position, thus in the disengagement position.

FIG. 9 illustrates a representation similar to FIG. 7 with the end cap 12 inserted into the receiver 14.

Starting from FIG. 8 with the locking bar 40 in the unlocked position and the operating device 41 in a radially outer pivot position the housing 11 with its end cap 12 is moved downward in a direction towards the receiver 14. When penetrating into the receiver 14 the centering bar 30 moves into the centering recess 23 of the receiver 14 with the receiving groove 31 of the centering bar 30. Thus, the trigger rib 25 penetrates into the receiving groove 31 and displaces the operating device 41 through pressure onto the trigger surface 51 from a radially outer pivot position of the operating device 41 towards the inner radial position against a force of the spring element 47. Thus, the locking bar 40 performs an opposite motion with its hook 42 that is initially still seated in the hook recess 50 wherein the hook moves into its outer radial position and thus moves from its locked position into its unlocked or idle position. In this idle position the engagement of hook 42 and hook recess 50 is disengaged. As soon as the hook 42 has moved out of the hook recess the spring element 36 impacts the end cap 12 and moves the end cap 12 in the direction A. Thus, the end cap 12 moves into its engagement position automatically where the locking skid 27 engages the bulge 21 and assures reliable fixing of the housing 11 in the receiver 14.

Self-acting unlocking of the end cap 12 from the disengagement position during insertion has the advantage that reliable fixing of the housing 11 in the receiver 14 is assured and the cargo compartment cover is reliably fixed in the vehicle. Operator error by the driver is thus excluded.

The function described with reference to the left end cap 12 and the left receiver 14 applies analogously to the function of the right end cap 13 and the right receiver 15.

REFERENCE NUMERALS AND DESIGNATIONS 10 storage compartment cover
11 housing
12 left/first end cap
13 right/second end cap
14 left/first receiver
15 right/second receiver
16 pull-out slot
17 recess
18 base
19 side wall
20 contact wall
21 bulge
22 attachment device
23 centering recess
24 trigger contour
25 trigger rib
26 locking device
27 locking skid
28 handle protrusion
29 receiving opening
30 centering bar
31 receiving groove
32 winding shaft
33 cover web
34 axial housing end
35 axial housing end
36 spring element
40 locking bar
41 operating device
42 hook
43 hook nose
44 locking element
45 pivot bearing
46 support protrusion
47 spring element
48 bearing pin
49 bearing race
50 hook recess
51 trigger surface
A direction towards outer axial end position
I direction towards inner axial end position
V reference line
X longitudinal housing axis

What is claimed is:

1. A storage compartment cover for a vehicle, the storage compartment cover comprising:
a housing that supports a winding shaft on an inside of the housing so that the winding shaft is rotatable about a winding shaft axis;
a cover web that is supported on the winding shaft and pullable from the winding shaft;
two axial housing ends that are respectively covered by respective end caps,
wherein at least one movable end cap of the respective end caps is movably supported between an axially outer engagement position and an axially inner disengagement position;
a spring element that supports the at least one movable end cap in the engagement position and imparts a spring reset force upon the at least one movable end cap when the at least one movable end cap is moved into the disengagement position;
a locking bar that retains the at least one moveable end cap in the disengagement position in a locked position of the locking bar and that facilitates a movement of the at least one movable end cap into the engagement position in an unlocked position of the locking bar;
an operating device that facilitates unlocking the locking bar so that the spring reset force moves the at least one movable end cap from the disengagement position into the engagement position;
locking devices arranged at the respective end caps;
receivers for the storage compartment cover,
wherein the receivers are at least indirectly fixed at a body of the vehicle and include attachment devices that cooperate with the locking devices and support the storage compartment cover when the at least one movable end cap is in the engagement position,
wherein the operating device unlocks the locking bar and moves the locking bar into its unlocked position during insertion of the at least one movably supported end cap into one of the receivers so that the at least one movably supported end cap is moved into the engagement position by the spring reset force of the spring element and secures the storage compartment cover in the receiver.

2. The storage compartment cover according to claim 1, wherein
the receiver includes at least one contact surface that cooperates in a surface pairing with an outer surface of the housing or an outer surface of the at least one moveable end cap,
wherein the operating device is arranged at the housing or at the at least one movably supported end cap and oriented towards the contact surface, and
wherein the operating device unlocks the locking bar when the surface pairing is provided.

3. The storage compartment cover according to claim 1, wherein the operating device includes a trigger surface that is aligned flush with the outer surface of the housing or the outer surface of the at least one movably supported end cap in the locked position of the locking bar or recessed towards a housing longitudinal axis with respect to the outer surface of the housing or the at least one movably supported end cap.

4. The storage compartment cover according to claim 3, wherein the receiver includes a trigger contour that cooperates with the operating device.

5. The storage compartment cover according to claim 4, wherein the trigger contour protrudes relative to a contact surface of the receiver for the at least one movably supported end cap.

6. The storage compartment cover according to claim 5,
wherein the trigger contour protrudes relative to a contact surface of the receiver for the at least one movably supported end cap, and
wherein the outer surface of the housing or the outer surface of the at least one movable end cap includes an axially oriented undercut which facilitates an axial movement of the at least one movable end cap when the trigger contour engages the at least one movable end cap.

7. The storage compartment cover according to claim 1,
wherein the operating device supports the locking bar, and
wherein the locking bar is provided integrally in one piece with the operating device.

8. The storage compartment cover according to claim 7, wherein the operating device is a hook that is pivotally arranged in the housing between the unlocked position and the locked position.

9. The storage compartment cover according to claim 3,
wherein the operating device supports the locking bar,
wherein the locking bar is provided integrally in one piece with the operating device,
wherein the operating device is a hook that is pivotally arranged in the housing between the unlocked position and the locked position,
wherein the hook includes a trigger arm that is arranged axially outside of a hook pivot axis along the winding shaft axis and a locking arm that is arranged axially inside of the hook pivot axis along the winding shaft axis, and
wherein the locking arm includes a hook nose and the trigger arm includes the trigger surface.

10. The storage compartment cover according to claim 9, wherein the trigger arm or the locking arm is spring loaded when the trigger arm or the locking arm support the hook nose in the locked position.

11. The storage compartment cover according to claim 1, wherein the operating device is arranged at a bottom side of the housing or of the at least one end cap.

12. The storage compartment cover according to claim 1,
wherein the locking bar and the operating device are arranged at the at least one movably supported end cap and a locking bar engagement is provided in an end portion of the housing that is covered by the at least one movable end cap, and
wherein the locking bar engages the locking bar engagement and supports the at least one movably supported end cap in the disengagement position.

* * * * *